United States Patent Office 2,977,197
Patented Mar. 28, 1961

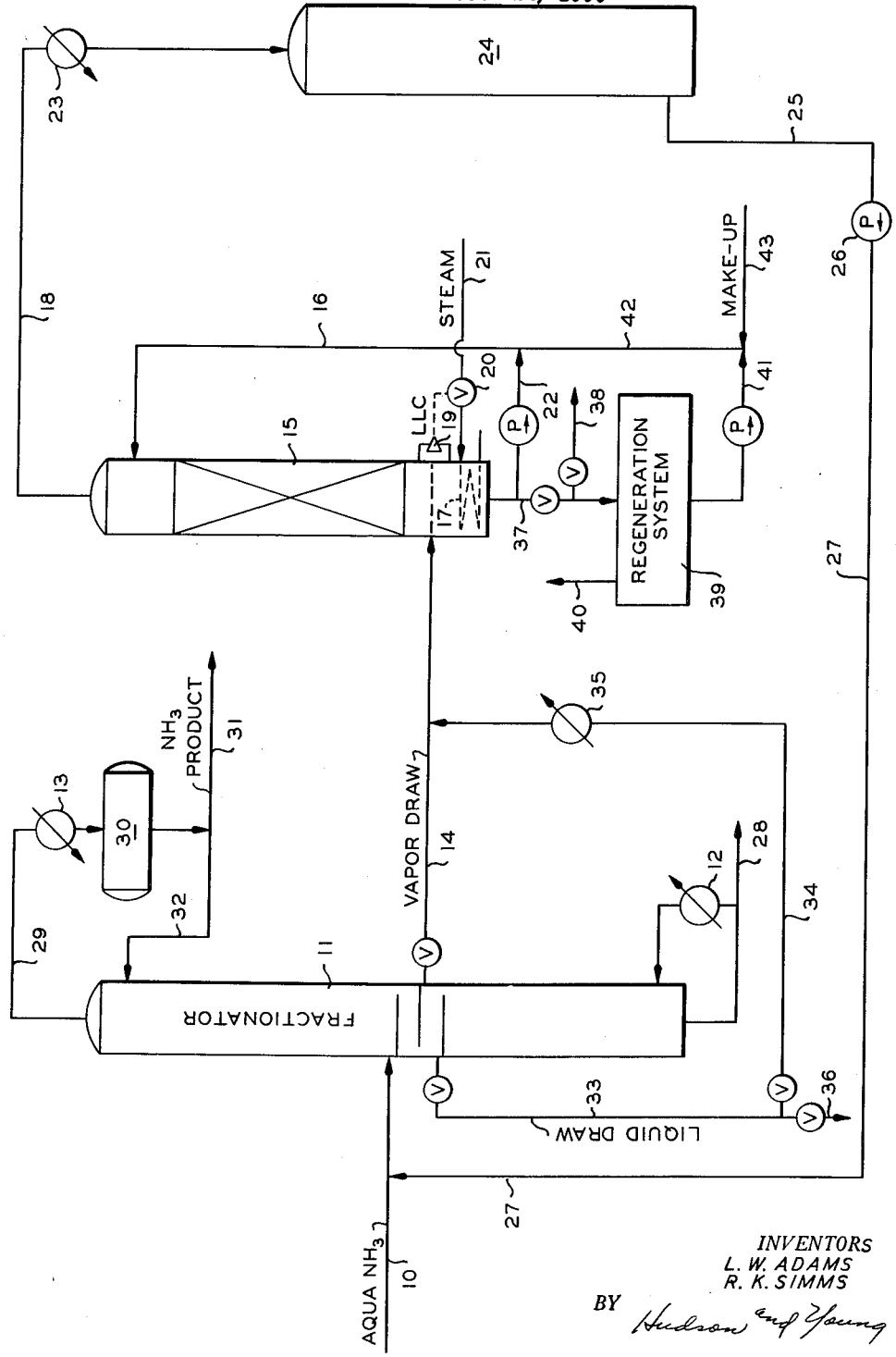

2,977,197

RECOVERY OF AMMONIA FROM AQUA AMMONIA

Loyd W. Adams and Russell K. Simms, Bartlesville, Okla., assignors to Phillips Petroleum Company, a corporation of Delaware Filed Oct. 24, 1956, Ser. No. 618,132

12 Claims. (Cl. 23—193)

This invention relates to the recovery of ammonia from aqua ammonia. In one aspect, this invention relates to the distillation of aqua ammonia to recover anhydrous ammonia therefrom. In another aspect, this invention relates to the elimination of carbon dioxide from anhydrous ammonia recovered by distilling aqua ammonia. In still another aspect, this invention relates to reducing the corrosion in equipment employed for the distillation of aqua ammonia.

In the production and sale of ammonia there are periods of peak demand and periods of slack demand. In order to most efficiently utilize ammonia producing facilities it is necessary to store the ammonia during the said slack periods. Several methods for storing ammonia have been proposed. Ammonia can be stored as liquid ammonia in pressure vessels or spheres. However, this method of storage is expensive where large quantities of ammonia must be stored because it is necessary to supply vessels having sufficient strength to withstand the vapor pressure generated by ammonia at higher atmospheric temperature, for example in the summer time, or provide facilities for withdrawing the vaporous ammonia as it forms, condense the said vapors and return the condensed ammonia to storage. Either method is expensive. It has also been proposed to store ammonia as liquid ammonia in underground caverns. However, this method of storage has the disadvantage that the ammonia frequently dissolves impurities from the cavern walls and must be distilled before it can be used.

Ammonia can also be stored as aqua ammonia by dissolving the ammonia in water. In ammonia producing plants it is customary to scrub various ammonia containing vent gas streams with water to recover the said ammonia. The aqua ammonia thus formed is then stored and sold as such or the ammonia recovered therefrom by distillation for sale as anhydrous ammonia. In general, the storage of ammonia as aqua ammonia has the disadvantage that large storage capacity is required; however, storing ammonia as aqua ammonia has the advantage of not requiring high pressure equipment. In recent years, the storage of aqua ammonia has increased and today large quantities of ammonia are thus stored. In our copending application, Serial No. 504,989, filed April 29, 1955, there is disclosed and claimed a method for storing ammonia as aqua ammonia at substantially atmospheric pressures.

Frequently, the water used in preparing aqua ammonia contains carbon dioxide in varying amounts. It is impractical to attempt to remove this carbon dioxide. The presence of the carbon dioxide presents no problem during the formation and storage of the ammonia as aqua ammonia. However, when said aqua ammonia is distilled to recover anhydrous ammonia, several difficulties are encountered. The presence of the carbon dioxide in the distillation equipment leads to the formation of ammonium carbonate which deposits on the top trays, and particularly in the overhead conduit from the fractionation column. Frequently, said conduit plugs to the extent that the equipment must be shut down and washed with water to remove said ammonium carbonate. This washing is not expensive in itself but it results in lost operating time on the equipment, which is expensive. Another serious difficulty which is encountered is increased corrosion, particularly in the lower portion of the column below the feed stream entry point. Said carbon dioxide also comes overhead with the ammonia product and when the ammonia is to be employed as a refrigerant the carbon dioxide is an undesirable diluent.

We have discovered that the concentration of carbon dioxide in the fractionating column builds up to a maximum within a region in the central portion of the column below the point of introduction of the feed to said column. We have also found that the above difficulties can be eliminated or substantially mitigated by withdrawing a side stream from said column at the point of maximum carbon dioxide concentration within said region, treating said side stream to remove the carbon dioxide, and then returning the treated side stream to the fractionation column. Thus, broadly speaking, our invention comprises withdrawing a side stream from an aqua ammonia fractionation column, treating said side stream to remove carbon dioxide, and returning the treated side stream to said fractionation column.

An object of this invention is to provide an improved method for recovering anhydrous ammonia from aqua ammonia. Another object of this invention is to eliminate carbon dioxide from anhydrous ammonia recovered from aqua ammonia. Another object of the invention is to reduce corrosion in equipment employed for the distillation of aqua ammonia. Still another object of this invention is to prevent the formation and deposition of ammonium carbonate in equipment employed for the distillation of aqua ammonia. Other aspects, advantages and objects of this invention will be apparent to those skilled in the art upon reading this disclosure.

Thus according to the invention there is provided a process for the recovery of anhydrous ammonia from aqua ammonia which also contains carbon dioxide, which process comprises: introducing said aqua ammonia into a fractionating column at a point intermediate its ends; withdrawing a side stream from said column at a point of maximum carbon dioxide concentration; treating said side stream to remove carbon dioxide therefrom; and returning the treating said side stream to said column.

In a presently preferred embodiment of the invention, the side stream is withdrawn as a vaporous side stream because a vaporous side stream is more convenient to process and substantial economies in heat requirements can be realized. However, a liquid side stream can be withdrawn since there is a corresponding region of high carbon dioxide concentration in the liquid phase within the fractionation column. The presence of carbon dioxide, ammonia, and water within the column leads to the formation of ammonium carbonate which has only a limited solubility in the concentrated ammonia present in the upper part of the fractionation column. Said ammonium carbonate flows down the column and as it approaches the bottom portion of the column, the higher temperatures there encountered decompose the ammonium carbonate with the liberation of carbon dioxide, ammonia, and water. Since the carbon dioxide and ammonia are only very slightly soluble in water at the temperatures employed in the lower portion of the column, there is built up in the central portion of the column a region of high concentration of carbon dioxide. Within said region, there will be a point of maximum carbon dioxide concentration. Said region of high carbon dioxide concentration and said point of maximum carbon dioxide concentration are usually found below the point of introduction of the feed to the column, and the extent and location of each will vary with design and operating conditions of the fractionation column as will be understood by those skilled in the art in view of this disclosure.

When operating according to our invention, it is seldom if ever necessary to shut down the column and wash out the overhead conduit, condenser, and the top trays of the column. This washing operation is done, if at all, during regular maintenance shut downs of the equipment. Corrosion within the column is also substantially reduced and carbon dioxide-free ammonia can be produced overhead from the column.

Referring now to the drawing, the invention will be more fully explained. It will be understood that said drawing is diagrammatic and many pumps, heat exchangers, etc. have been omitted for simplicity. A stream of aqua ammonia is introduced through line 10 into a conventional fractionation column 11 equipped with conventional bubble trays. Fractionation conditions are maintained in said column by the introduction of heat from reboiler 12 and supplying reflux from accumulator 30 as will be understood by those skilled in the art. A vaporous side stream comprising water vapor, ammonia, and carbon dioxide is withdrawn from column 11 through line 14 from the space between a pair of trays located below the point of introduction of the feed to the fractionator. Said side stream is introduced into the lower portion of treating column 15 wherein it is contacted countercurrently with a stream of alkaline absorbent introduced into the upper portion of said treating column 15 through line 16. Treating column 15 can be a packed column, as shown, packed with Raschig rings or any other suitable packing material, or it can be a conventional bubble tray column. A level of said treating solution is maintained within the bottom portion of treating column 15. Heat is supplied to said alkaline treating solution by means of heating element 17.

Since it is desirable to not weaken or reduce the concentration of the alkaline treating agent, the water vapor in said side stream introduced into treating column 15 is all taken overhead through line 18 along with the ammonia. The carbon dioxide is removed by said treating agent. In order to maintain the level of the treating agent in the bottom of treating column 15, and thus maintain its concentration, the amount of heat supplied to said treating agent is only sufficient to cause the water in the side stream to be removed overhead from the column 15. Thus, liquid level control 19 is employed to actuate motor valve 20 in heating medium line 21. Treating solution from the bottom of tower 15 is withdrawn through line 22 and recirculated for introduction into the top of the tower via line 16 as described.

The water vapor and ammonia gas removed overhead from tower 15 via line 18 are condensed in condenser 23 to form carbon dioxide-free aqua ammonia and passed into overhead accumulator 24. Said carbon dioxide-free aqua ammonia is then passed via line 25, pump 26, and line 27 to line 10 where it is introduced into fractionation column 11 along the fresh feed to said column. Tailing water, substantially free of ammonia, is withdrawn from the bottom of fractionator 11 through line 28. Anhydrous ammonia product is removed overhead from said fractionator 11 through line 29, condenser 13, accumulator 30 and passed to storage through line 31. A portion of said anhydrous ammonia is returned to the column as liquid reflux through line 32 as previously described.

If desired, a liquid side stream can be withdrawn from said fractionation column 11 through line 33 and passed via line 34 and heater 35 to line 14 for introduction into treating column 15 wherein it is treated in the same manner as described for said vaporous side stream. If desired, said liquid side stream can be passed from line 33 through line 36 to storage or other use, such as an ammonium sulfate manufacturing plant.

The amount of side stream withdrawn will vary in accordance with the amount of carbon dioxide in the aqua ammonia feed stream. Said amount will be greater when the side stream is withdrawn as a liquid. For example, when the feed stream contains about 2000 p.p.m. of carbon dioxide, the concentration of carbon dioxide in the region of maximum concentration within the tower will build up to between 10,000 and 20,000 p.p.m. Withdrawal of a vaporous side stream amounting to about 10 percent of the fresh feed, or a liquid side stream amounting to about 20 percent of said feed, will prevent build-up of the carbon dioxide to excessive concentrations and make possible the realization of the advantages of the invention.

In the operation of treating column 15, a portion of the spent treating solution can be withdrawn through line 37 and discarded through line 38 or passed through regeneration system 39 in which the carbon dioxide is removed from said treating solution and vented through line 40. Regenerated treating solution is passed via lines 41 and 42 into line 16 for reuse as described. Make-up treating solution can be added to the system through line 43.

Operating conditions within fractionation column 11 will vary in accordance with the design of the column and the composition of the feed thereto as will be understood by those skilled in the art. For most aqua ammonia feed streams and fractionation columns of conventional design, such as one having from 20 to 30 trays, it will be found that the top tower temperature will usually be within the range of about 80 to about 120° F. and the bottom tower temperature within the range of about 350 to 420° F. The top tower pressure will usually be within the range of about 135 to 220 pounds per square inch gauge and the bottom tower pressure will usually be within the range of 140 to 225 pounds per square inch gauge.

Operating conditions within treating tower 15 will also vary in accordance with the composition of the feed stream, the design of said treating tower, and the particular treating solution used. For example, when using an aqueous caustic solution and treating a side stream comprising from 5 to 15 percent ammonia, the temperature within said treating tower will be maintained within the range of 300 to 400° F. and the pressure within the range of 50 to 85 pounds per square inch gauge.

Any suitable alkaline treating agent capable of removing the carbon dioxide from said side stream can be used in treating tower 15. Suitable treating solutions are aqueous solutions of sodium hydroxide, potassium hydroxide, etc. The various amine absorbents, such as monoethanolamine and/or mixtures of other amines can also be used. Ordinary caustic soda is a presently preferred treating agent because of its low cost.

The following examples will serve to further illustrate the invention.

EXAMPLE I

A feed stream of aqua ammonia containing 40 percent by weight ammonia and about 2000 parts per million of carbon dioxide is introduced at a temperature of about 200° F. and a rate of 120 gallons per minute onto the 23rd tray from the bottom of a 4 foot diameter, 30 tray fractionating column. Said column is operated at a top tower temperature of about 110° F. and a top tower pressure of about 200 p.s.i.g. The bottom of the tower is maintained at about 397° F. and about 205 p.s.i.g. A tailing water stream in the amount of 44 gallons per minute and containing from two to three parts by million of carbon dioxide and about 0.4 percent by weight ammonia is removed as a bottom stream from said fractionator. A stream of essentially anhydrous ammonia containing about 2000 parts per million of carbon dioxide is removed overhead from said fractionation column.

In the operation of said column, it is found that the carbon dioxide concentration builds up to a maximum within the central portion of said column in a region approximately between trays 8 and 22, and thereafter comes overhead with the anhydrous ammonia product in an amount substantially equal to the amount in the feed to the tower. It is also found that ammonium carbonate forms and deposits as a solid in the overhead conduit from said column, and sometimes on the top trays of said column. The deposition of this solid ammonium carbonate makes it necessary to shut down the column and wash said lines and top trays with water about once each 48 hours. The corrosion within said tower, particularly in the region between trays 8 and 22, is severe. It has been found that a tower fabricated from ordinary carbon steel will last only about 90 days in this service.

EXAMPLE II 120 gallons per minute of the same aqua ammonia as in Example I is charged to the same fractionation column operated under essentially the same conditions as given in Example I. A vaporous side stream in the amount of about 156 cubic feet per minute, at tower operating conditions, is withdrawn from the space between trays 17 and 18. Said side stream is passed to a treating column packed with Raschig rings wherein it is contacted countercurrently with a stream of 15 percent by weight caustic solution at a temperature of about 350° F. and under a pressure of about 65 p.s.i.g. Said caustic solution reacts with and removes the carbon dioxide from said side stream. The water vapor and ammonia in said side stream are removed overhead from the treating column, condensed, and reintroduced along with the original feed to said fractionation column. When operating the fractionation column in this manner, it is found that the overhead anhydrous ammonia stream contains no carbon dioxide, that the corrosion within said column is substantially eliminated, and substantially no deposition of ammonium carbonate occurs in the overhead conduit and on the top trays of said column.

EXAMPLE III

A series of steel coupon samples were weighted and placed in a 4 foot diameter 20 tray functionating column employed for the distillation of aqua ammonia. Said coupon samples were placed at the locations indicated in Table I below. Table I gives the calculated corrosion rates based on loss of metal from these samples during an exposure period of 83 days.

Table I
CALCULATED RATES, IN MILS PER YEAR

|  | Downcomer from Top Tray (2) | Between Trays 14–15 | Between Trays 8–9 | Under bottom tray (1) |
| --- | --- | --- | --- | --- |
| Type 316SS [a] | 0.01 | 1.00 | 10.26 | 0.09 |
| Type 317SS [b] | 0.05 | 0.67 | 4.89 | 0.07 |
| Carpenter 20 [c] | 0.09 | 1.60 | 8.52 | 0.13 |

[a] 316 stainless steel, Fe; 16–18% Cr; 10–14% Ni; 0.1% max. C; 1.75–2.75% Mo.
[b] 317 stainless steel, Fe; 17.5–20% Cr; 10–14% Ni; 0.1% max. C; 3–4% Mo.
[c] Carpenter 20 steel, Fe; 20.0% Cr; 29% Ni; 0.07% max. C; 2.0% min. Mo; 0.75% Mn; 1.0% Si; 3.0% Cu.

These results show there is a region of extremely severe corrosion in the central portion of the column.

As will be evident to those skilled in the art, various modifications of the invention can be made or practiced in the light of the above disclosure without departing from the spirit or scope of the invention.

We claim:

1. A process for the recovery of anhydrous ammonia from aqua ammonia which also contains carbon dioxide, which process comprises: introducing said aqua ammonia into a fractionating column at a point intermediate its ends; operating said column under distillation conditions such that a region of high carbon dioxide concentrating forms in the central portion of said column; withdrawing a side stream containing carbon dioxide from said column at a point of maximum carbon dioxide concentration within said region of high carbon dioxide concentration; treating said side stream to remove carbon dioxide therefrom; returning the treated side stream to said column; and recovering essentially carbon dioxide-free anhydrous ammonia product overhead from said column.

2. The process of claim 1 wherein said side stream is a vaporous side stream.

3. The process of claim 1 wherein said side stream is a liquid side stream.

4. A process for the recovery of essentially carbon dioxide-free anhydrous ammonia from aqua ammonia having carbon dioxide dissolved therein, which process comprises: introducing said aqua ammonia into a fractionating column at a point intermediate its ends; operating said column under distillation conditions such that a region of high carbon dioxide concentration forms in the central portion of said column; withdrawing a side stream containing carbon dioxide from said column at a point of maximum carbon dioxide concentration within said region of high carbon dioxide concentration; contacting said side stream with an alkaline treating agent in a treating zone; removing carbon dioxide-free side stream from said treating zone; returning said carbon dioxide-free side stream to said column together with said aqua ammonia; and recovering essentially carbon dioxide-free anhydrous ammonia product overhead from said column.

5. The process of claim 4 wherein said side stream is withdrawn from said column as a vapor and said alkaline treating agent is an aqueous solution of sodium hydroxide.

6. The process of claim 4 wherein said side stream is withdrawn from said column as a liquid and said alkaline treating agent is an aqueous solution of sodium hydroxide.

7. A process for the recovery of essentially carbon dioxide-free anhydrous ammonia from aqua ammonia having carbon dioxide dissolved therein, which process comprises: introducing said aqua ammonia into a fractionating column at a point intermediate its ends; operating said column under distillation conditions such that a region of high carbon dioxide concentration forms in the central portion of said column; withdrawing a side stream containing carbon dioxide from said column at a point of maximum carbon dioxide concentration within said region of high carbon dioxide concentration below said point of introduction of said aqua ammonia; introducing said side stream into the lower portion of a treating zone having a maintained level of caustic solution in the bottom portion thereof; supplying heat to said caustic solution and controlling the amount of heat supplied in accordance with said level; countercurrently contacting said side stream with caustic solution at an elevated temperature withdrawn from the bottom portion of said treating zone and reintroduced into the upper portion of said treating zone; removing treated carbon dioxide-free side stream overhead from said treating zone; condensing said treated side stream and returning same together with said aqua ammonia to said column; withdrawing essentially ammonia-free water from the bottom of said column; and removing essentially carbon dioxide-free anhydrous ammonia product overhead from said column.

8. The process of claim 7 wherein said side stream is withdrawn from said column as a vapor.

9. The process of claim 7 wherein said side stream is withdrawn from said column as a liquid.

10. A process for the recovery of anhydrous ammonia from aqua ammonia which also contains carbon dioxide, which process comprises: introducing said aqua ammonia into a fractionating column at a point intermediate its ends, said fractionating column being operated with a top tower temperature within the range of about 80 to about 120° F., a bottom tower temperature within the range of about 350 to about 420° F., and a pressure within the range of about 135 to about 225 pounds per square inch gauge; withdrawing a side stream containing carbon dioxide from said column at a point of maximum carbon dioxide concentration within a region of high carbon dioxide concentration which forms in the central portion of said column; treating said side stream to remove carbon dioxide therefrom; returning the treated side stream to said column; and recovering essentially carbon dioxide-free anhydrous ammonia product overhead from said column.

11. A process for the recovery of essentially carbon dioxide-free anhydrous ammonia from aqua ammonia having carbon dioxide dissolved therein, which process comprises: introducing said aqua ammonia into a fractionating column at a point intermediate its ends; said fractionating column being operated with a top tower temperature within the range of about 80 to about 120° F., a bottom tower temperature within the range of about 350 to 420° F., and a pressure within the range of about 135 to about 225 pounds per square inch gauge; withdrawing a side stream containing carbon dioxide from said column at a point of maximum carbon dioxide concentration within a region of high carbon dioxide concentration which forms in the central portion of said column; contacting said side stream with an alkaline treating agent in a treating zone; removing carbon dioxide-free side stream from said treating zone; returning said carbon dioxide-free side stream to said column together with said aqua ammonia; and recovering essentially carbon dioxide-free anhydrous ammonia product overhead from said column.

12. The process of claim 11 wherein said side stream is withdrawn from said column as a vapor, said alkaline treating agent is an aqueous solution of sodium hydroxide, and said treating zone is operated at a temperature within the range of 300 to 400° F. and a pressure within the range of 50 to 85 pounds per square inch gauge.

References Cited in the file of this patent

UNITED STATES PATENTS

| | | |
|---|---|---|
| 2,012,621 | Bennett | Aug. 27, 1935 |
| 2,018,863 | Miller | Oct. 29, 1935 |